(12) United States Patent
Ho et al.

(10) Patent No.: US 11,356,614 B2
(45) Date of Patent: Jun. 7, 2022

(54) IMAGE CAPTURING ASSEMBLIES

(71) Applicant: Hewlett-Packard Development Company, L.P., Spring, TX (US)

(72) Inventors: Chin-Chang Ho, Taipei (TW); Jen-Hsun Hsieh, Taipei (TW); Po Cheng Liao, Taipei (TW); Chen Ee Eunice Goh, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/053,173

(22) PCT Filed: Sep. 26, 2018

(86) PCT No.: PCT/US2018/052863
§ 371 (c)(1),
(2) Date: Nov. 5, 2020

(87) PCT Pub. No.: WO2020/068063
PCT Pub. Date: Apr. 2, 2020

(65) Prior Publication Data
US 2021/0243375 A1 Aug. 5, 2021

(51) Int. Cl.
*H04N 5/232* (2006.01)
*H04N 5/225* (2006.01)
*G06F 1/16* (2006.01)

(52) U.S. Cl.
CPC ....... *H04N 5/23299* (2018.08); *G06F 1/1686* (2013.01); *H04N 5/2257* (2013.01)

(58) Field of Classification Search
CPC .. H04N 5/23299; H04N 5/225; H04N 5/2251; H04N 5/2252; H04N 5/225251;
(Continued)

(56) References Cited

U.S. PATENT DOCUMENTS

2005/0031335 A1 2/2005 Itzkowitz
2005/0220451 A1* 10/2005 Cho ................ H04N 5/2254
396/349

(Continued)

FOREIGN PATENT DOCUMENTS

CN 1677215 A 10/2005
CN 101010613 A 8/2007
(Continued)

OTHER PUBLICATIONS

From Gun Camera to GunPro: A Short History of Small Cameras, Through The Lens Film School, Nov. 16, 2014 pp. 1-7.

*Primary Examiner* — Nelson D. Hernández Hernández
(74) *Attorney, Agent, or Firm* — Lakshmi Kumaran & Sridharan (57) ABSTRACT

An electronic device includes a body and an image capturing assembly mounted on the body. The image capturing assembly comprising an imaging device and a device control assembly coupled to the imaging device to control a movement of the imaging device along a central axis of the image capturing assembly to allow the imaging device to be positioned at multiple positions along the central axis of the image capturing assembly. The device control assembly includes a first guide member, a second guide member rotatably disposed within the first guide member, and an inner body movably disposed within the second guide member. In response to a rotational motion of the second guide member with respect to the first guide member, the inner body is to move in axial direction with respect to the second guide member to move the imaging device along the central axis of the image capturing assembly.

15 Claims, 7 Drawing Sheets

(58) Field of Classification Search
CPC .... H04N 5/2257; G06F 1/1686; G03B 17/00; H04M 1/0264; H04M 2250/52; H04M 2250/20
See application file for complete search history.

(56) References Cited

U.S. PATENT DOCUMENTS

2011/0134234 A1* 6/2011 Kim .................. A61B 90/20
348/80
2012/0262621 A1 10/2012 Sato et al.
2018/0004256 A1 1/2018 Douglas et al.

FOREIGN PATENT DOCUMENTS

| CN | 102668538 A | 9/2012 |
|----|----|----|
| CN | 103828341 A | 5/2014 |
| CN | 104516404 A | 4/2015 |
| CN | 104883487 A | 9/2015 |
| CN | 104023190 B | 2/2017 |
| CN | 206117831 U | 4/2017 |
| CN | 107740921 A | 2/2018 |
| CN | 207586615 U | 7/2018 |
| KR | 10-0636534 B1 | 10/2006 |
| KR | 10-2007-0002854 A | 1/2007 |
| WO | WO-2008103418 A2 | 8/2008 |

* cited by examiner

IMAGE CAPTURING ASSEMBLIES

BACKGROUND

Electronic devices, such as laptop and desktop computers, may include an in-built imaging device, such as a camera, housed within a body of a display screen of the electronic device. The imaging device in such electronic devices may be accessed to capture images and videos for photography, videography, video calls, video conferencing, etc.

BRIEF DESCRIPTION OF DRAWINGS

The detailed description is described with reference to the accompanying figures. It would be noted that the description and figures are merely example of the present subject matter and are not meant to represent the subject matter itself.

DETAILED DESCRIPTION

Imaging devices, such as cameras, provided in electronic devices, such as laptops, tablets, and display monitors, may be accessed by users for capturing images and videos. Apart from a user accessing an imaging device, applications installed on an electronic device may also access the imaging device to provide functionalities associated with the applications. For example, a video conferencing application that is installed in an electronic device for providing video conferencing functionality may access the imaging device for a user to share a video with other participants during the video conference. Different users may have different heights and may keep the electronic devices at varying heights while using the imaging device. The imaging devices are usually fixed at a top edge of the body of the electronic device, above the display screen, to allow the imaging device to capture images at wider angle and cover the maximum possible portion of the user. However, a field of view of the imaging device, i.e., an area within which the imaging device may capture an image, may vary due to various factors including user's height (height from ground up to eye level of the user during use of the electronic device), device height (distance from ground up to a base of the electronic device), and/or imaging device height (height of the display screen). Thus, the user may have to adjust at least one of the above listed factors to be able to effectively use the imaging device. As the imaging device is in-built, the user may have to adjust either the user height or the height of the display screen. Thus, the user may try to increase a height of the electronic device by placing the electronic device over raised platforms or objects kept over a table. Thus, the positioning of the electronic device may have to be adjusted each time a user, different from a previous user, wishes to use the imaging device.

In one approach, a spring-based mechanism is used to move the imaging device between a first position (corresponding to a de-compressed state of the spring) and a default position of the imaging device within the body of the electronic device (corresponding to a compressed state of the spring). Thus, in said approach, the imaging device may be positioned at the above two positions. However, if either of the two positions is not in accordance to the height of the user, the user may still have to adjust the above factors, such as their sitting positions or height of the electronic device.

The present subject matter discloses example implementations of an image capturing assembly for an electronic device. The image capturing assembly may include an in-built imaging device and a device control assembly coupled to the imaging device to control a movement of the imaging device along a central axis of the image capturing assembly. In one example, the device control assembly may include a first guide member, a second guide member rotatably disposed within the first guide member, and an inner body movably disposed within the second guide member. The concentric arrangement of the first guide member, the second guide member, and the inner body is provided such that, in response to a rotational motion of the second guide member with respect to the first guide member, the inner body is to move in an axial direction with respect to the second guide member to move the imaging device along the central axis of the image capturing assembly. As the imaging device is mounted on the inner body, the imaging device may move along the central axis of the image capturing assembly, in response to an axial movement of the inner body. Thus, the axial movement of the inner body may be governed using the rotational motion of the second guide member to allow the imaging device to be positioned at multiple positions along the central axis of the image capturing assembly.

In one example implementation of the present subject matter, the image capturing assembly may be mounted on a body of the electronic device, such that the imaging device is housed within the body as an in-built imaging device. Further, the device control assembly may be mounted such that a second base end of the second guide member is accessible to the user, to rotate the second guide member. Further, the imaging device is mounted on a third top end of the inner body. The first guide member includes a first top end, a first base end, and an inner wall having a helical guiding track extending from the first base end to the first top end. The second guide member may include second top end, a second base end, and a wall having a guiding slot. The inner body may include a third top end for mounting the imaging device and a lug protruding from a third base end of the inner body. In one example, the lug is to extend through the guiding slot of the second guide member to engage with the helical guiding track to glide therein such that, in response to a rotational motion of the second guide member with respect to the first guide member, the lug glides along the helical guiding track to move the inner body in an axial direction along the guiding slot with respect to the second guide member.

In operation, to move the imaging device to a desirable height, the user may rotate the second base end of the second guide member accessible from a back side of the body of the electronic device. As the user starts rotating the second end, the second guide member may start rotating around its central axis, with respect to the first guide member. As the second guide member starts rotating, guiding slot may align with the helical guiding track owing to which the lug may enter the helical guiding track and start gliding along the helical guiding track, rotating the inner body along its central axis. However, the glide of the lug may be limited due to a wall of the guiding slot and the lug may move vertically up along the guiding slot, thereby moving the inner body in the axial direction along the guiding slot. Such a simultaneous movement of the lug along the helical guiding track and the guiding slot may impart the axial movement to the inner body and the imaging device. Further, once the imaging device reaches the desirable height, the user may stop rotating the second base end. When the user again has to adjust the height of the imaging device or move the imaging device back to its default position within the electronic device, the user may rotate the second base end to move the imaging device.

The present subject matter may thus facilitate in easily adjusting a height of the imaging device as per a user's desire, without use of external components and a complex mechanism. The user may easily rotate the second base end of the device control assembly using hands and without any external components or tools to adjust the height of the imaging device. Thus, the electronic device may be kept on a platform and used by various users without moving the electronic device or adjusting a seating arrangement of the user, irrespective of height of the user. Further, having the present mechanism of the concentric guide members and the inner body allows the imaging device to be adjusted to multiple positions.

The present application is further described with reference to FIGS. 1 to 7. It would be noted that the description and figures merely illustrate principles of the present application. Various arrangements may be devised that, although not explicitly described or shown herein, encompass the principles of the present application. Moreover, all statements herein reciting principles, aspects, and examples of the present application, as well as specific examples thereof, are intended to encompass equivalents thereof.

Figure 1:
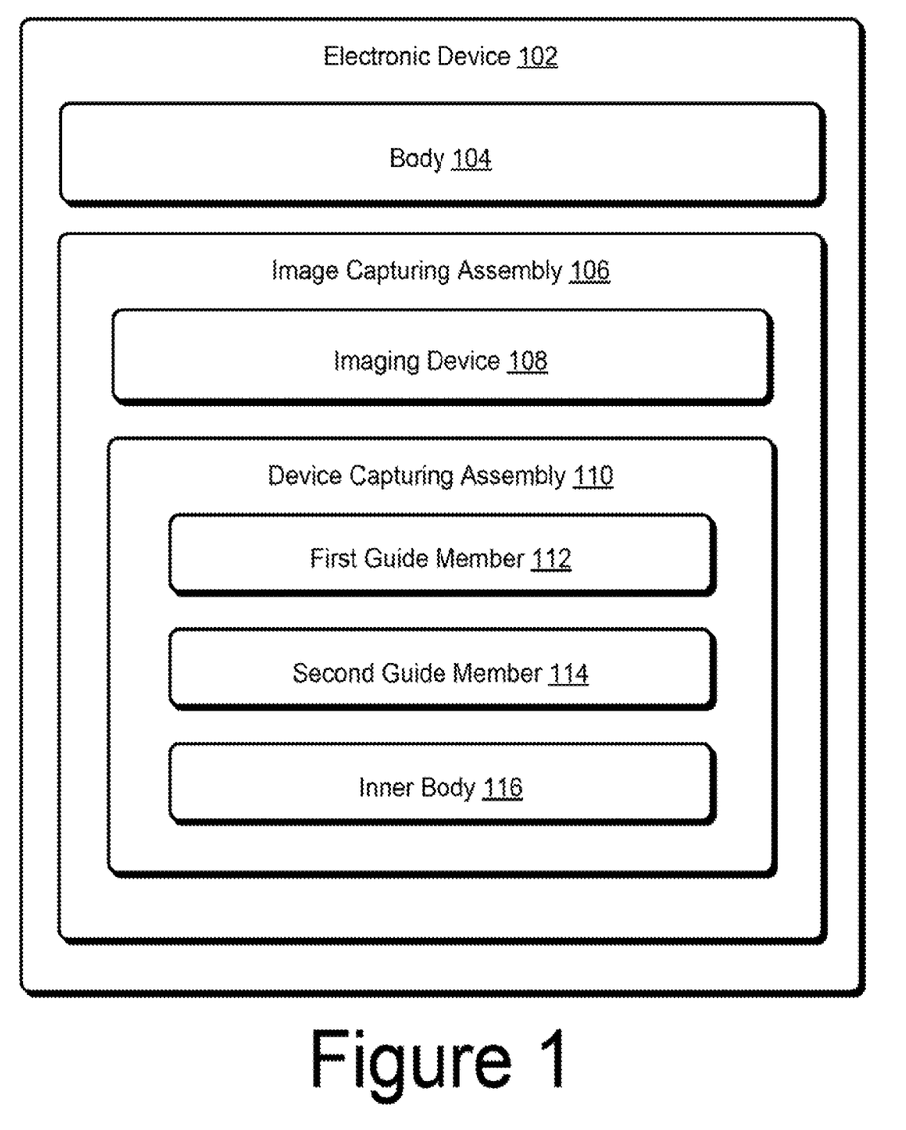
FIG. 1 illustrates a block diagram of an electronic device, according to an example of the present subject matter.

FIG. 1 illustrates a block diagram of an electronic device 102, according to an example implementation of the present subject matter. Examples of the electronic device 102 include, but are not limited to, laptops, tablets, and display monitors. In accordance to an example implementation of the present subject matter, the electronic device 102 includes a body 104 and an image capturing assembly 106 mounted on the body 104. The body 104 may be a housing or an enclosure of the electronic device 102, housing various components of the electronic device 102. The image capturing assembly 106 may be a webcam assembly having an in-built imaging device 108 and a device control assembly 110 coupled to the imaging device 108 to control a movement of the imaging device 108. The imaging device 108 may be, for example, a camera or a phototransistor used to capture images and videos for photography, videography, video calls, video conferencing, etc.

In one example implementation of the present subject matter, the device control assembly 110 may be used to control a movement of the imaging device 108 along a central axis of the image capturing assembly 106. In one example, the device control assembly 110 includes a first guide member 112 and a second guide member 114 rotatably disposed within the first guide member 112. Further, an inner body 116 may be movably disposed within the second guide member 114 such that, in response to a rotational motion of the second guide member 114 with respect to the first guide member 112, the inner body 116 is to move in an axial direction with respect to the second guide member 114 to move the imaging device 108 along the central axis of the image capturing assembly 106. The device control assembly 110 is to thus allow the imaging device 108 to be positioned at multiple positions along the central axis of the image capturing assembly 106 based on the rotational motion of the second guide member 114.

Figure 2:
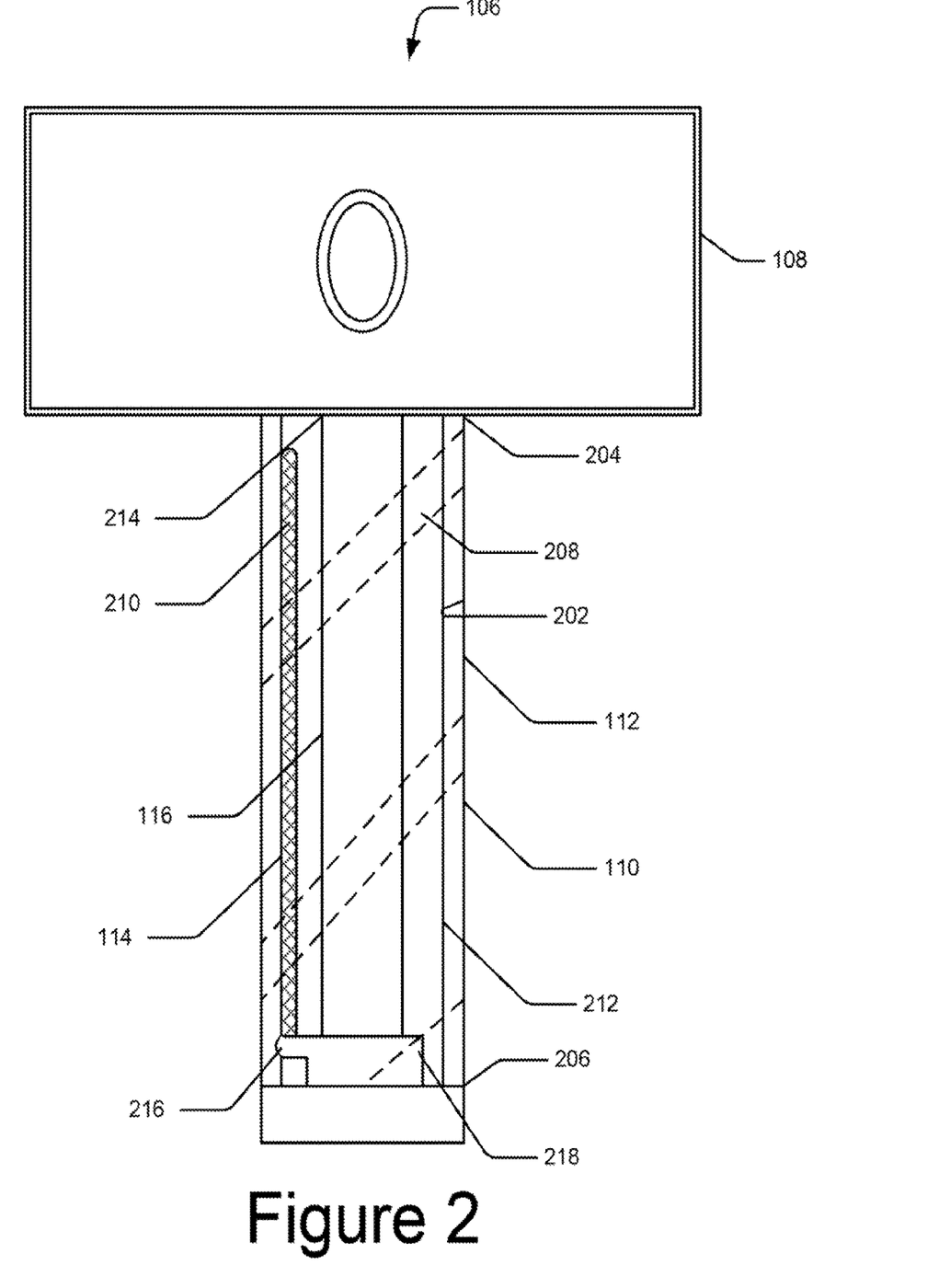
FIG. 2 illustrates an image capturing assembly, according to an example of the present subject matter.

FIG. 2 illustrates the image capturing assembly 106, according to an example of the present subject matter. In one example, the image capturing assembly 106 may be provided within an electronic device to capture images and videos for photography, videography, video calls, video conferencing, etc. In another example, the image capturing assembly 106 may be mounted on an electronic device to capture the images and videos. Examples of the electronic device 102 include, but are not limited to, laptops, tablets, and display monitors.

In accordance to an example implementation of the present subject matter, the image capturing assembly 106 includes the imaging device 108 and the device control assembly 110. The imaging device 108 may be, for example, a camera or a phototransistor. The device control assembly 110 may be coupled to the imaging device 108 to control the movement of the imaging device 108 along a central axis of the image capturing assembly 106. In one example, the device control assembly 110 may include the first guide member 112, the second guide member 114 rotatably disposed within the first guide member 112, and the inner body 116 movably disposed within the second guide member 114. The first guide member 112 may include an inner wall 202, a first top end 204, and a first base end 206. In one example, the first guide member 112 may further include a helical guiding track 208 on the inner wall 202, extending from the first base end 206 to the first top end 204. As the helical guiding track 208 is on the inner wall 202 and may thus not be visible from the outside, dotted lines have been used to symbolically illustrate the helical guiding track 208. Further, walls of the first guide member 112 and the second guide member 114 have been shown as transparent to allow the second guide member 114 and the inner body 116, respectively, to be visible.

The second guide member 114 may include a guiding slot 210 in a wall 212 thereof. The inner body 116 may include a third top end 214 for mounting the imaging device 108. The inner body 116 may further include a lug 216 protruding from a third base end 218 of the inner body 116. In one example, the lug 216 is to extend through the guiding slot 210 of the second guide member 114 to engage with the helical guiding track 208 to glide therein. For instance, in response to a rotational motion of the second guide member 114 with respect to the first guide member 112, the lug 216 glides along the helical guiding track 208. In one example, the lug 216 may glide along the helical guiding track 208 to move the inner body 116 in an axial direction along the guiding slot 210 with respect to the second guide member 114.

Figure 3:
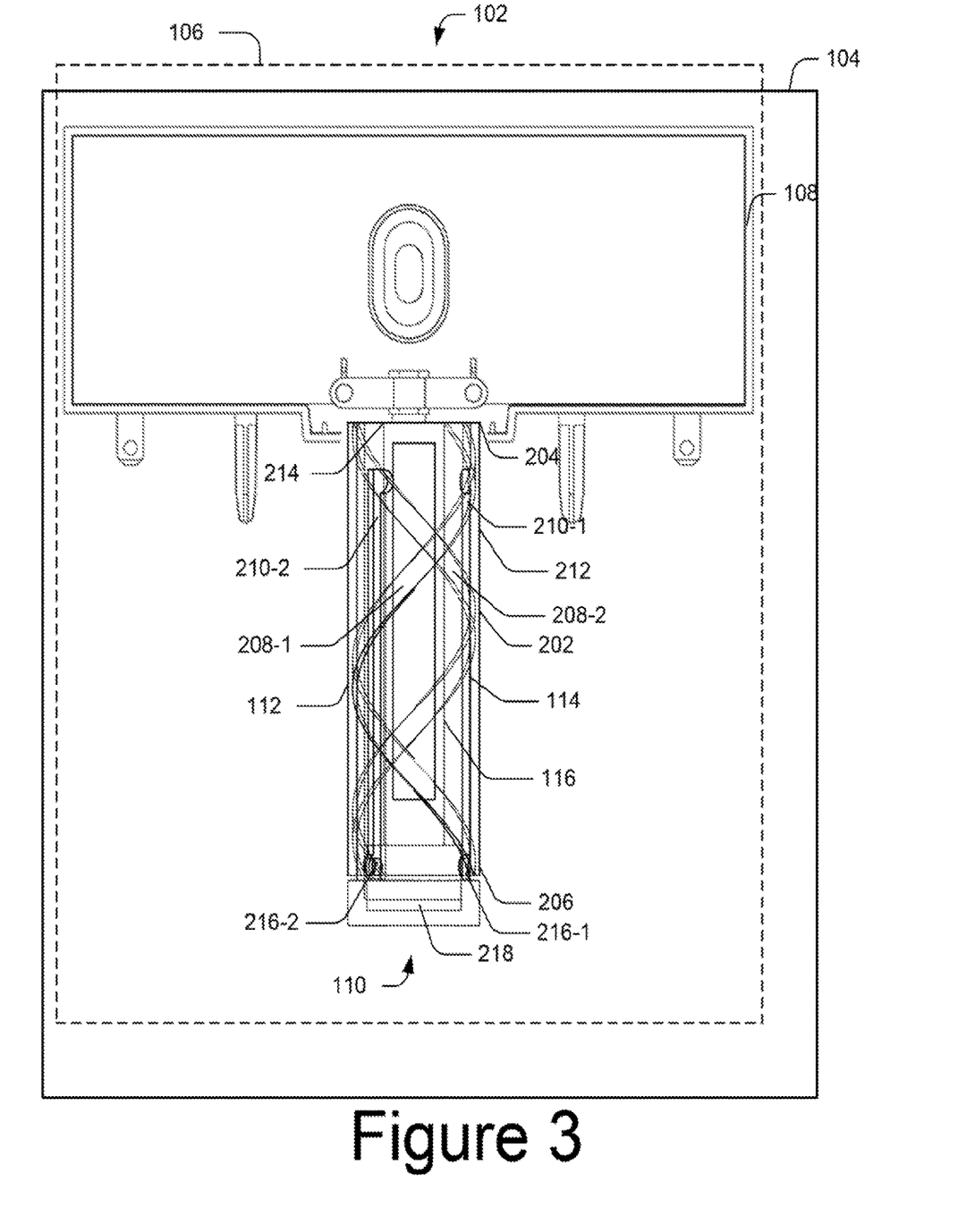
FIG. 3 illustrates an electronic device, according to an example of the present subject matter.

FIG. 3 illustrates the electronic device 102, according to an example of the present subject matter. Examples of the electronic device 102 include, but are not limited to, laptops, tablets, and display monitors. In one example, the electronic device 102 may include the body 104 and the image capturing assembly 106. As previously described, the body 104 may be a housing or an enclosure of the electronic device 102, for holding various components of the electronic device 102.

The image capturing assembly 106 may include the imaging device 108 and the device control assembly 110 coupled to the imaging device 108 to control a movement of the imaging device 108 along a central axis of the image capturing assembly 106. Further, the device control assembly 110 includes the first guide member 112 having the inner wall 202, the first top end 204, the first base end 206, and helical guiding tracks 208-1 and 208-2 on the inner wall 202. The helical guiding tracks 208-1 and 208-2 may extend from the first base end 206 to the first top end 204 and are hereinafter collectively referred to as helical guiding tracks 208 and individually as helical guiding track 208.

The device control assembly 110 further includes the second guide member 114 rotatably disposed within the first guide member 112. In one example, the second guide member 114 includes guiding slots 210-1 and 210-2 in the wall 212 of the second guide member 114. The guiding slots 210-1 and 210-2 are hereinafter collectively referred to as guiding slots 210 and individually as guiding slot 210.

The device control assembly 110 further includes the inner body 116 movably disposed within the second guide member 114. The inner body 116 may include the third top end 214 for mounting the imaging device 108. The inner body 116 may further include a plurality of lugs 216-1 and 216-2 protruding from the third base end 218 of the inner body 116. The lugs 216-1 and 216-2 are hereinafter collectively referred to as lugs 216 and individually as lug 216. In one example, each of the plurality of lugs 216 is to extend through a corresponding guiding slot 210 of the second guide member 114 to engage with the corresponding helical guiding track 208 to glide therein. In one example, the lug 216 may simultaneously glide within the helical guiding track 208 and the guiding slot 210 to move the inner body 116 in an axial direction with respect to the second guide member 114, in response to a rotational motion of the second guide member 114 with respect to the first guide member 112.

Figure 4:
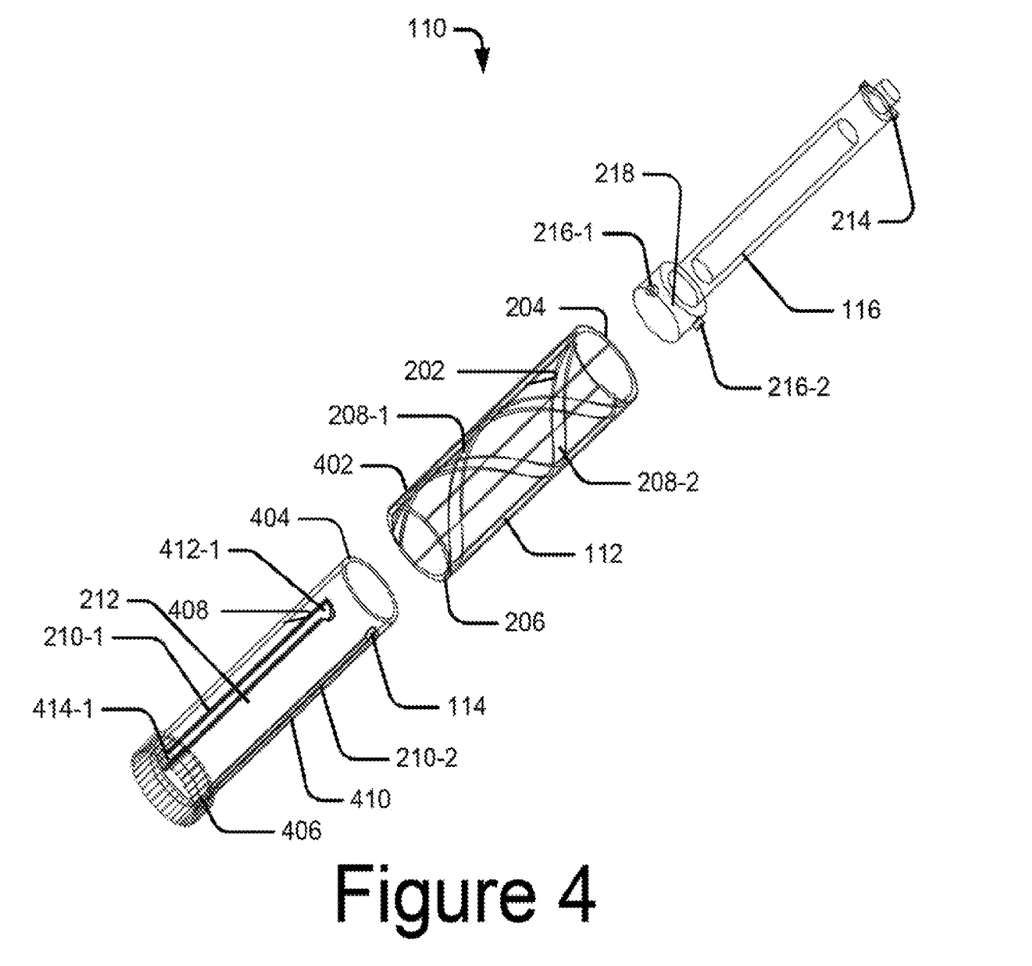
FIG. 4 illustrates an exploded view of a device control assembly of an image capturing assembly, according to an example of the present subject matter.

FIG. 4 illustrates an exploded view of the device control assembly 110 of the image capturing assembly 106, according to an example of the present subject matter. As previously described, the device control assembly 110 may include the first guide member 112, the second guide member 114, and the inner body 116. In one example, the first guide member 112 may be a hollow cylindrical cam having the inner wall 202 and an outer wall 402. Further, the helical guiding tracks 208-1 and 208-2, extending from the first top end 204 to the first base end 206, are provided on the inner wall 202.

The second guide member 114 may be a hollow cylindrical cam having the wall 212, a second top end 404, a second base end 406, and the plurality of guiding slots 210-1 and 210-2. In one example, the guiding slots 210 are the wall such that guiding slots 210 extend through the wall 212, from an inner surface 408 of the wall 212 to an outer surface 410 of the wall 212. The guiding slots 210 may extend from the second base end 406 up to a predetermined length across the wall 212. In one example, the predetermined length may be equal to the height up to which the imaging device 108 may be moved up from the body 104 of the electronic device. Further, each of the guiding slots 210 may include lateral extensions, such as a top lateral extension 412 and a bottom lateral extension 414 at a top end and a base end, respectively of the guiding slot 210. For instance, a first guiding slot 210-1 may have a first top lateral extension 412-1 and a first bottom lateral extension 414-1.

The inner body 116 may be an axial shaft having the third top end 214, the third base end 218, and the plurality of lugs 216-1 and 216-2 protruding from the third base end 218. In one example, the length of the lugs 216 may be substantially equal to a sum of the thickness of the wall 212 and a depth of the helical guiding tracks 208 in the inner wall 202 such that in an assembled state, the lug 216 may extend through the guiding slot 210 and extend into the helical guiding track 208.

In one example implementation, the inner body 116 may have a single lug 216, the second guide member 114 may have a single guiding slot 210, and the first guide member 112 may have a single helical guiding track 208. In another example implementation, the inner body 116 may have a plurality lugs 216, the second guide member 114 may have a plurality of guiding slots 210, and the first guide member 112 may have a plurality of helical guiding tracks 208.

Figure 5:
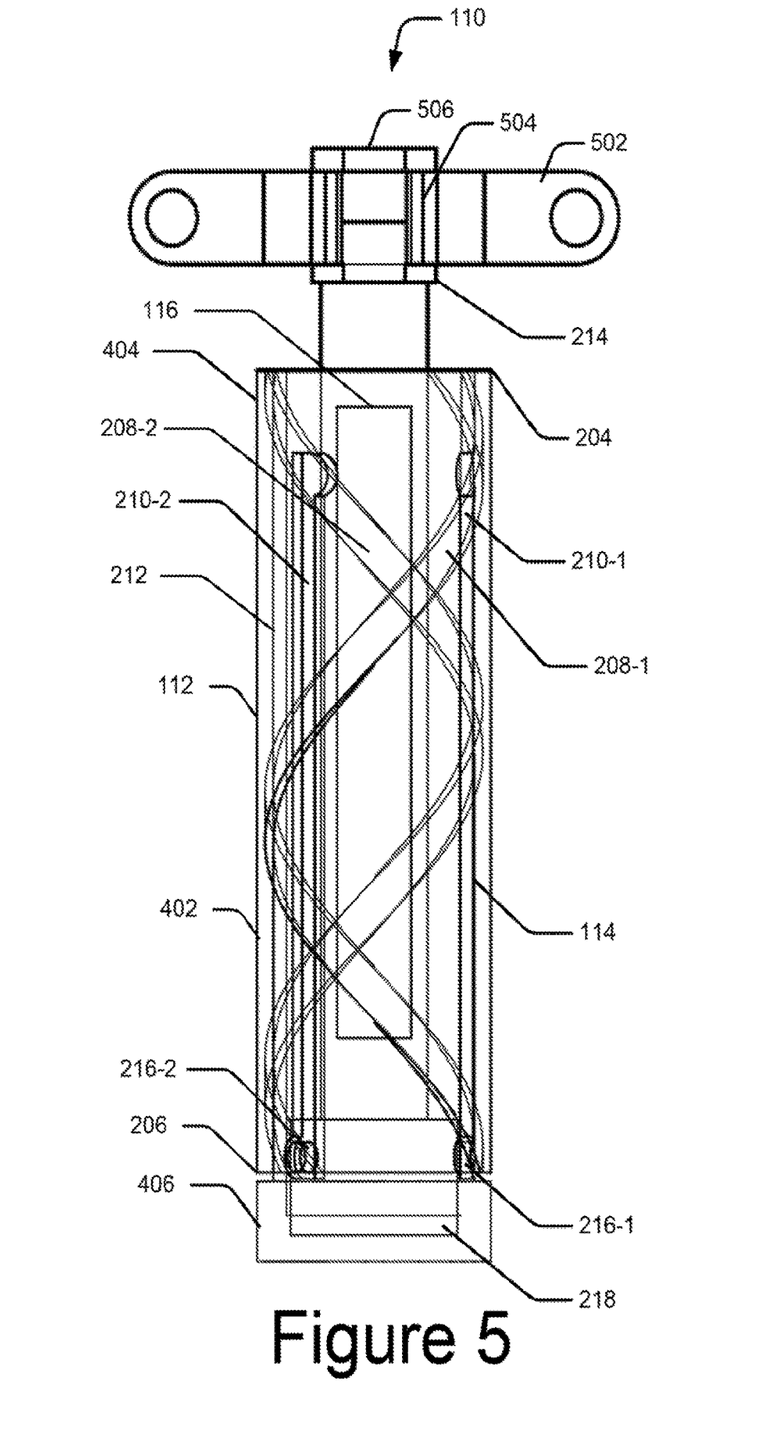
FIG. 5 illustrates a device control assembly in an assembled state, according to an example of the present subject matter.

FIG. 5 illustrates the device control assembly 110 in an assembled state, according to an example of the present subject matter. As illustrated, in the assembled state, inner body 116 is disposed inside the second guide member 114 and the first guide member 112 is mounted over second guide member 114 such that the inner body 116, the second guide member 114, and the first guide member 112 are concentric. In one example, the third base end 218 is movably disposed within the second base end 406 in a default position of the imaging device 108, such that each of the plurality of lugs 216 is housed within the corresponding guiding slots 210. The default position of the imaging device 108 may correspond to a position at which the imaging device 108 is housed within the body 104 by manufacture and may correspond to a lowest position of the imaging device 108 along the central axis of the device control assembly 110. Further, the first base end 206 of the first guide member 112 is superposed over the second base end 406 of the second guide member 114. In one example, the first top end 204 of the first guide member 112 aligns with the second top end 404 of the second guide member 114. The third top end 214 of the inner body 116 may protrude out of the first top end 204 of the first guide member 112 and the second top end 404 of the second guide member 114.

Further, in the default position of the imaging device 108, each of the plurality of lugs 216 is housed within the corresponding bottom lateral extension 414 of the guiding slots 210. For instance, a first lug 216-1, protruding from the third base end 218 may extend through the first bottom lateral extension 414-1 of a first guiding slot 210-1 to engage with a first helical guiding track 208-1 of the first guide member 112. Further, a second lug 216-2 protruding from the third base end 218 may extend through a second bottom lateral extension of the second guiding slot 210-2 to engage with a second helical guiding track 208-2.

In one example implementation, the third top end 214 of the inner body 116 may be coupled to a first mounting bracket 502 for coupling the device control assembly 110 with the imaging device 108. In one example, the first mounting bracket 502 may include an orifice 504 to receive the third top end 214 of the inner body 116. In one example, a diameter of the third top end 214 may be lesser than an internal diameter of the orifice 504 to allow the third top end 214 to freely rotate within the first mounting bracket 502 in response to the rotational motion of the second guide member 114. The device control assembly 110 may further include an inner body top cover 506 to clamp the first mounting bracket 502 with the third top end 214. As illustrated, the inner body top cover 506 may be mounted over the first mounting bracket 502 to clamp the first mounting bracket 502 with the third top end 214.

Figure 6:
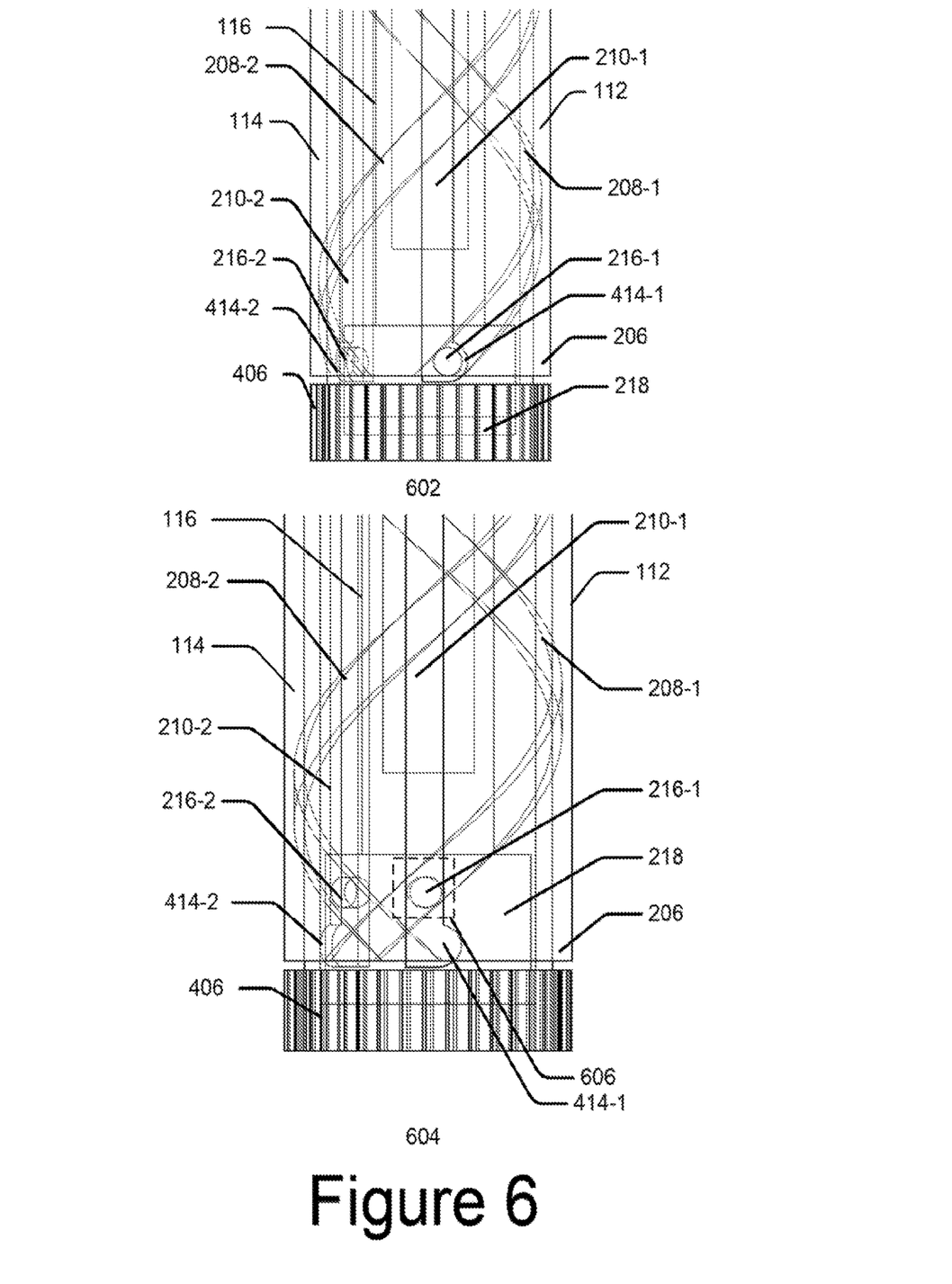
FIG. 6 illustrates a device control assembly at various stages of operation, according to an example of the present subject matter.

FIG. 6 illustrates the device control assembly 110 at various stages of operation, according to an example of the present subject matter. Initially, the first guide member 112, the second guide member 114, and the inner body 116 are assembled in a default state, as illustrated in the FIG. 5 and view 602. In the default state of the device control assembly 110, the imaging device 108 is at the default position. As illustrated, in the default state of the device control assembly 110, the third base end 218 is disposed within the second base end 406 and the lugs 216-1 and 216-2 are housed within the corresponding bottom lateral extensions 414-1 and 414-2 of the guiding slots 210-1 and 210-2, respectively. Further, the lugs 216 extend into the corresponding helical guiding tracks 208 through the corresponding guiding slots 210.

To adjust a height of the imaging device 108, a user of the electronic device 102 may rotate the second base end 406 in a predetermined direction, for instance a clockwise direction. As the user rotates the second base end 406 with respect to the first base end 206, the second guide member 114 rotates with respect to the first guide member 112. As the second guide member 114 rotates, a reaction force is applied on the lugs 216 along the direction of rotation. However, as the lugs 216 are engaged within the guiding slots 210 and the helical guiding tracks 208, the movement of the lugs 216 is restrained within the parameters of the helical guiding tracks 208. Thus, the movement of the lugs 216 gets confined within a parallelogram shaped intersection area 606 of the guiding slots 210 and the helical guiding tracks 208. As the second guide member 114 rotates, the reaction force applied on the lugs 216 causes the lugs 216 to move axially upwards within the intersection area 606, in an axial direction with respect to the second guide member 114. Thus, the lugs 216 simultaneously glide within the helical guiding track 208 and the guiding slot 210 to move the inner body 116 in an axial direction with respect to the second guide member 114, as illustrated in the view 604.

The movement of the inner body 116 in the axial direction with respect to the second guide member 114 moves the imaging device 108 along a central axis of the image capturing assembly 106. In one example, a clockwise rotational motion of the second guide member 114 may result in an upward movement of the inner body 116 and the imaging device 108, thus allowing the user to increase the height of the imaging device 108. In said example, a counterclockwise rotational motion of the second guide member 114 may result in a downward movement of the inner body 116 and the imaging device 108, thus allowing the user to decrease the height of the imaging device 108. In another example, a counterclockwise rotational motion of the second guide member 114 may result in an upward movement of the inner body 116 and the imaging device 108, thus allowing the user to increase the height of the imaging device 108. In said example, a clockwise rotational motion of the second guide member 114 may result in a downward movement of the inner body 116 and the imaging device 108, thus allowing the user to decrease the height of the imaging device 108.

Further, as the axial movement of the imaging device 108 is in accordance to the rotational motion of the second guide member 114, the user may control the rotational motion of the second guide member 114 to control the axial movement of the imaging device 108. For instance, to adjust the height of the imaging device 108 to be inline of user's face, the user may continue to rotate the second base end 406 till the imaging device 108 reaches a target position, to be in line with the user's face. As the imaging device 108 reaches the target position, the user may stop rotating the second base end 406, in turn making the imaging device 108 to stop at the target position. To retract the imaging device 108, the user may rotate the second base end 406 in a direction opposite to the direction in which the user rotated the second base end 406 to extend the imaging device 108 from the default position of the imaging device.

Figure 7:
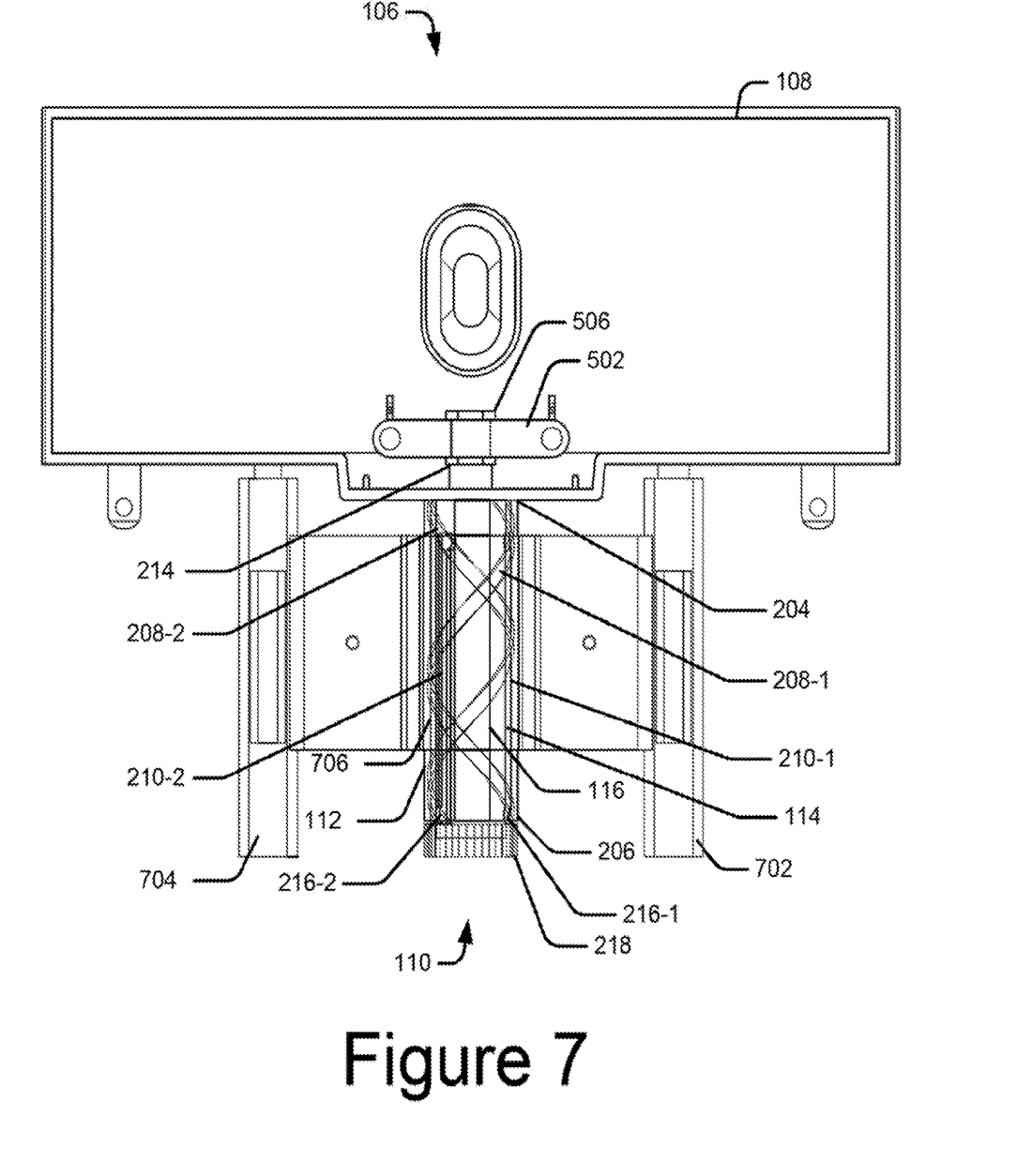
FIG. 7 illustrates the image capturing assembly, according to another example of the present subject matter.

FIG. 7 illustrates the image capturing assembly 106, according to another example of the present subject matter. In one example, the FIG. 7 illustrates the image capturing assembly 106 in an assembled state, for being mounted on a body of an electronic device. In one example, the image capturing assembly 106 may include the first mounting bracket 502 for mounting the imaging device 108 at the third top end 214. The image capturing assembly 106 may further include a second mounting bracket 702 for mounting the image capturing assembly on the body of the electronic device. In one example, the second mounting bracket 702 may include a bottom plate (not shown in the figures) and a top plate 704. To assemble the image capturing assembly 106, the device control assembly 110 may be initially rested on the bottom plate and the top plate 704 may be then mounted over the bottom plate, enclosing the device control assembly 110 within a mounting bracket orifice 706, as illustrated in the FIG. 7.

Further, the third top end 214 may be inserted within the orifice of the first mounting bracket 502 and the inner body top cover 506 may be placed at the third top end 214 to clamp the first mounting bracket 502. The first mounting bracket 502 may then be attached to the imaging device 108 using fastening elements, such as screws, clamps, and pins. The image capturing assembly 106, thus obtained, may be mounted on the body of electronic device using the second mounting bracket 702. In one example, the second mounting bracket 702 may be attached to body using the fastening elements, such as screws, clamps, and pins.

Although examples for the present subject matter have been described in language specific to structural features and/or methods, it would be understood that the appended claims are not limited to the specific features or methods described. Rather, the specific features and methods are disclosed and explained as examples of the present subject matter.

We claim:

1. An electronic device comprising:
   a body; and
   an image capturing assembly mounted on the body, the image capturing assembly comprising:
   an imaging device; and
   a device control assembly coupled to the imaging device to control a movement of the imaging device along a central axis of the image capturing assembly, wherein the device control assembly is to allow the imaging device to be positioned at multiple positions along the central axis of the image capturing assembly, and wherein the device control assembly includes:
   a first guide member;
   a second guide member rotatably disposed within the first guide member;
   an inner body movably disposed within the second guide member, wherein, in response to a rotational motion of the second guide member with respect to the first guide member, the inner body is to move in an axial direction with respect to the second guide member to move the imaging device along the central axis of the image capturing assembly; and
   a first mounting bracket for mounting the imaging device at a third top end of the inner body.

2. The electronic device as claimed in claim 1, wherein the first guide member comprises:
   a first top end;

a first base end; and
an inner wall having helical guiding tracks extending from the first base end to the first top end.

3. The electronic device as claimed in claim 2, wherein the second guide member comprises:
an inner wall having guiding slots;
a second top end to align with the first top end of the first guide member; and
a second base end, wherein in response to a rotational motion of the second base end with respect to the first base end, the second guide member is to rotate with respect to the first guide member.

4. The electronic device as claimed in claim 3, wherein the inner body comprises:
a third top end for mounting the imaging device; and
a plurality of lugs protruding from a third base end of the inner body, wherein each of the plurality of lugs is to extend through a corresponding guiding slot of the second guide member to engage with a corresponding helical guiding track to glide therein, and wherein, in response to the rotational motion of the second guide member with respect to the first guide member, the lug glides along the corresponding helical guiding track to move the inner body in an axial direction along the corresponding guiding slot with respect to the second guide member.

5. The electronic device as claimed in claim 4, wherein the inner body comprises:
a first lug protruding from the third base end of the inner body, wherein the first lug is to extend through a first guiding slot of the second guide member to engage with a first helical guiding track of the first guide member; and
a second lug protruding from the third base end of the inner body, wherein the second lug is to extend through a second guiding slot of the second guide member to engage with a second helical guiding track of the first guide member.

6. The electronic device as claimed in claim 1, further comprising:
an inner body top cover to couple the first mounting bracket with the third top end of the inner body; and
a second mounting bracket for mounting the image capturing assembly on the body.

7. The electronic device as claimed in claim 1, wherein the first mounting bracket comprises an orifice to receive the third top end of the inner body, and wherein a diameter of the third top end is lesser than an internal diameter of the orifice to allow the third top end of the inner body to freely rotate within the first mounting bracket in response to the rotational motion of the second guide member.

8. An image capturing assembly comprising:
an imaging device; and
a device control assembly coupled to the imaging device to control a movement of the imaging device along a central axis of the image capturing assembly, the device control assembly comprising:
a first guide member having an inner wall, a first top end, and a first base end, the first guide member having a helical guiding track on the inner wall, extending from the first base end to the first top end;
a second guide member rotatably disposed within the first guide member, the second guide member having a guiding slot in a wall thereof;
an inner body movably disposed within the second guide member, the inner body comprising:
a third top end for mounting the imaging device; and
a lug protruding from a third base end of the inner body, wherein the lug is to extend through the guiding slot of the second guide member to engage with the helical guiding track to glide therein, and wherein, in response to a rotational motion of the second guide member with respect to the first guide member, the lug glides along the helical guiding track to move the inner body in an axial direction along the guiding slot with respect to the second guide member; and
a first mounting bracket for mounting the imaging device at the third top end of the inner body, the first mounting bracket including an orifice to receive the third top end of the inner body.

9. The image capturing assembly as claimed in claim 8, wherein the second guide member includes:
a second top end to align with the first top end of the first guide member; and
a second base end, wherein the first base end of the first guide member is superposed over the second base end, and wherein the third base end of the inner body is movably disposed within the second base end of the second guide member in a default position of the imaging device, and in response to a rotational motion of the second base end with respect to the first base end, the second guide member is to rotate with respect to the first guide member.

10. The image capturing assembly as claimed in claim 8, wherein the lug is to simultaneously glide along the helical guiding track and the guiding slot to move the inner body to multiple positions in the axial direction along the guiding slot to allow the imaging device to be positioned at multiple positions along the central axis of the image capturing assembly.

11. The image capturing assembly as claimed in claim 8, further comprising:
an inner body top cover to clamp the first mounting bracket with the third top end of the inner body.

12. The image capturing assembly as claimed in claim 8, wherein a diameter of the third top end is lesser than an internal diameter of the orifice to allow the third top end of the inner body to freely rotate within the first mounting bracket in response to the rotational motion of the second guide member.

13. An electronic device comprising:
a body; and
an image capturing assembly comprising:
an imaging device; and
a device control assembly coupled to the imaging device to control a movement of the imaging device along a central axis of the image capturing assembly, the device control assembly comprising:
a first guide member having an inner wall, a first top end, and a first base end, the first guide member having helical guiding tracks on the inner wall, extending from the first base end to the first top end;
a second guide member rotatably disposed within the first guide member, the second guide member having guiding slots in a wall thereof; and
an inner body movably disposed within the second guide member, the inner body comprising:
a third top end for mounting the imaging device; and
a plurality of lugs protruding from a third base end of the inner body, wherein each of the plurality of lugs is to extend through a corresponding guiding slot of the second guide member to engage with the corresponding helical guiding track to glide therein, and wherein, in response to a rotational motion of the second guide member with respect to the first guide member; and a first mounting bracket for mounting the imaging device at the third top end of the inner body, the first mounting bracket includes an orifice to receive the third top end of the inner body.

14. The electronic device as claimed in claim 13, further comprising:

an inner body top cover to couple the first mounting bracket with the third top end of the inner body; and a second mounting bracket for mounting the image capturing assembly on the body.

15. The electronic device as claimed in claim 13, wherein a diameter of the third top end is lesser than an internal diameter of the orifice to allow the third top end of the inner body to freely rotate within the first mounting bracket in response to the rotational motion of the second guide member.

* * * * *